UNITED STATES PATENT OFFICE 2,250,899

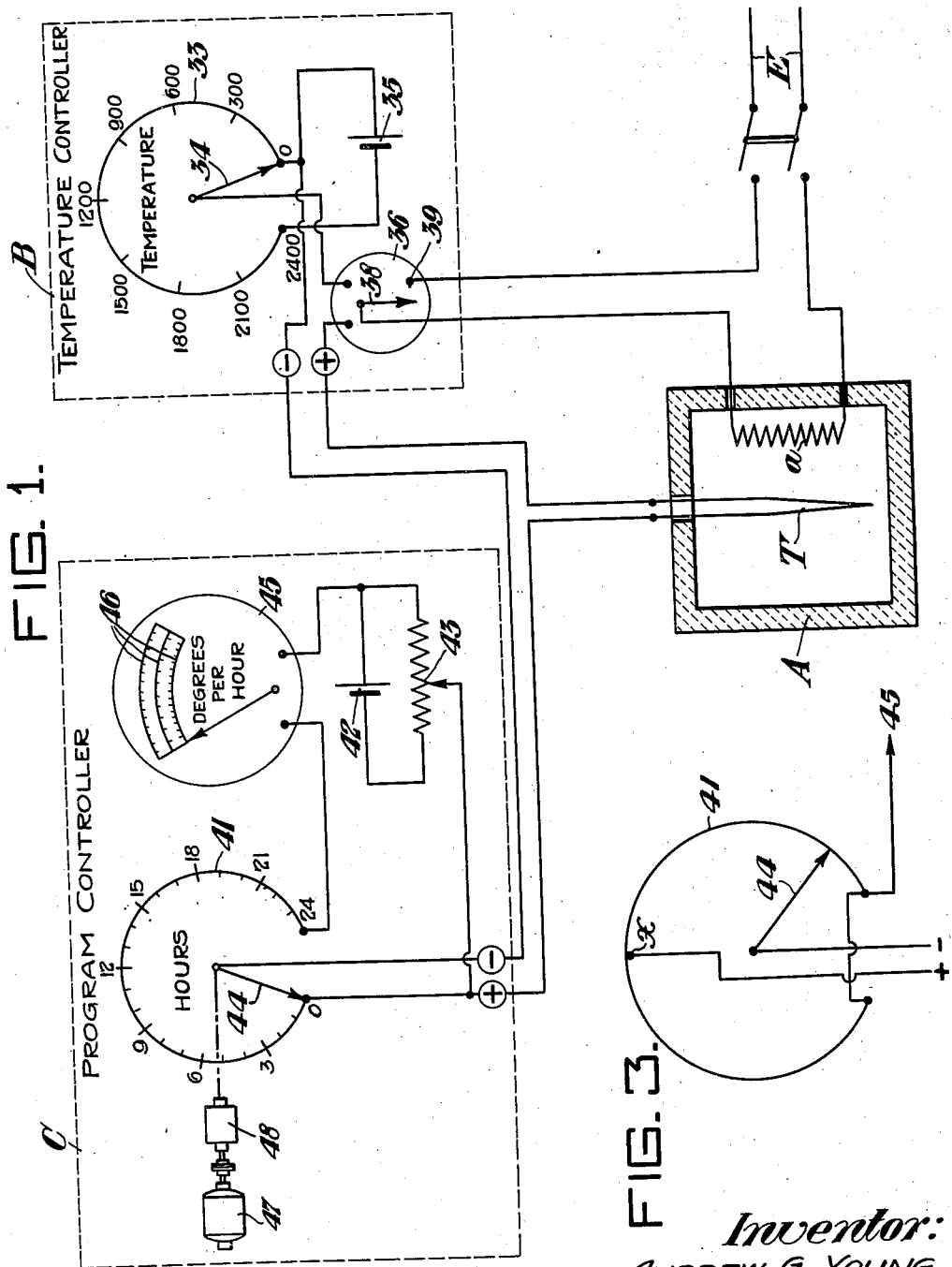

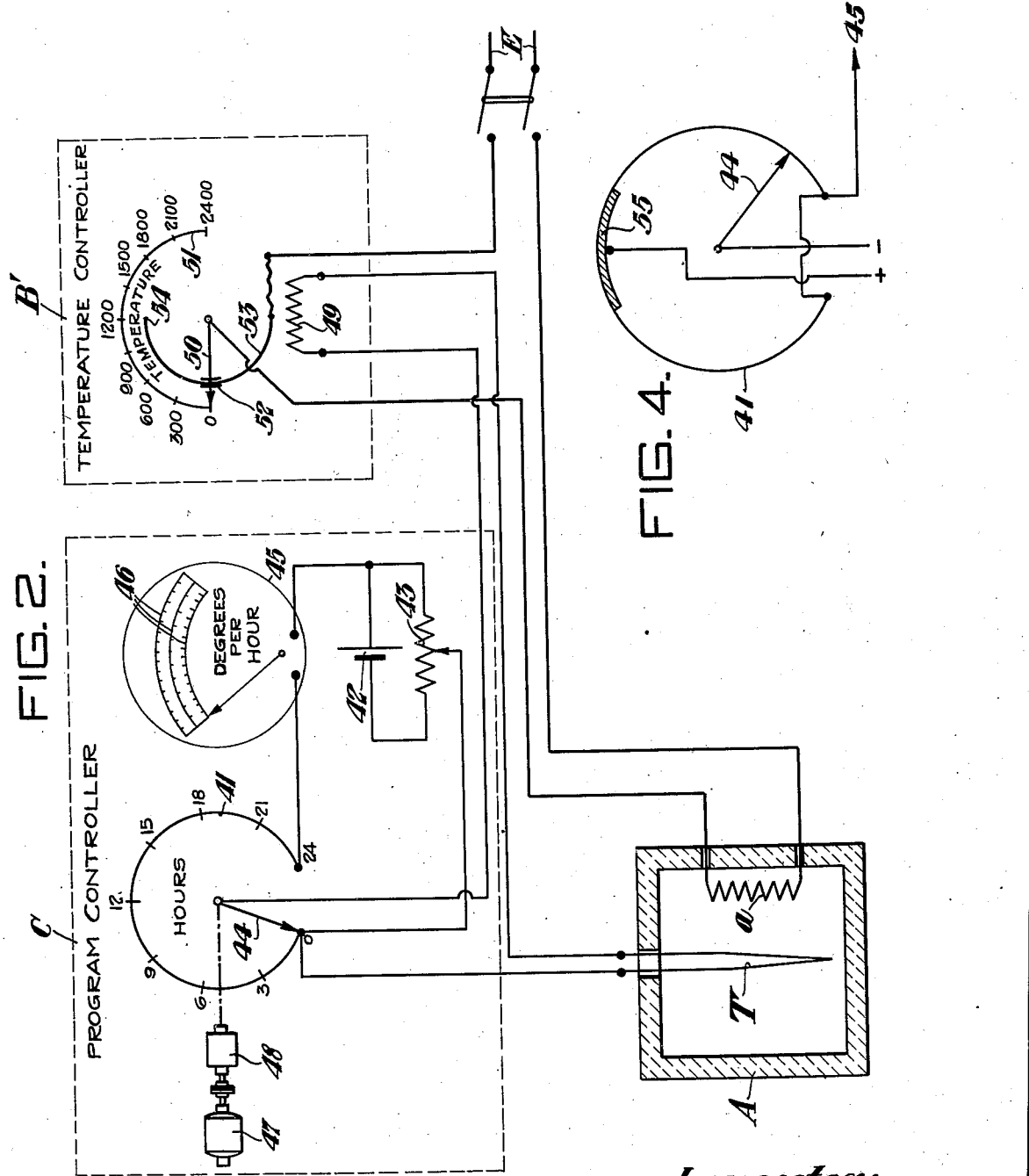

PROGRAM CONTROLLER

Andrew G. Young, Pittsburgh, Pa.

Application April 4, 1940, Serial No. 327,910

8 Claims. (Cl. 236—46)

This invention relates to an improved apparatus for controlling the rate of application of energy in any form which may be measured by its proportionality to an electromotive force, and has particular application to temperature control apparatus, the present application being a continuation-in-part of my former application, Serial No. 149,986, filed June 23, 1937.

The program control equipment heretofore available has contained operating limitations which, in some instances, restricted the use of the control unit to a single specific program and, in other instances, in order to use the control unit for different ranges of temperature or the like, or with cooperating equipment having different performance characteristics, it has been necessary to make changes in the operating mechanism of the program control equipment.

To indicate the limitations of the program equipment heretofore available, and to more clearly set forth the improvements incorporated in the present invention, the following is to be noted: The rate of application of heat energy has been controlled according to a desired program by utilizing a conventional type of temperature controller, the normal function of which is merely to maintain, within narrow limits, a desired furnace operating temperature. One form of temperature control apparatus consists of a potentiometer including a slide wire resistance of known value, a thermocouple and a second source of current, i. e., a dry cell, and an uncalibrated deflection galvanometer. By manual setting of the slide wire contact, the furnace operator establishes the control temperature which it is desired to maintain. Changes in temperature to which the thermocouple is exposed within the furnace create a change in the potential balance of the potentiometer circuit causing a deflection of the galvanometer. Electromechanical arrangements detect this deflection and adjust the furnace heating so that the temperature of the thermocouple is returned to the desired control temperature. To obtain a rate of change program control by utilizing such temperature control apparatus, two adaptations have heretofore been made.

According to the first adaptation, the slide wire contact, mentioned above, is driven along the slide wire so as to give continuous and progressive change in control temperature setting, which change may be made to progress at any desired linear rate of heating. The main objection to this type of adaptation is that, in order to obtain different linear rates of change in heating, it is necessary to change the gear ratios in the drive gear train. Moreover, even by the provision of a large number of gear ratio changes, only a limited and discontinuous series of rates of change are thereby made available. It is obviously impractical to provide the number of gear ratio changes which would be required to afford a series of rates of change, each differing from the preceding rate by a desired minute increment.

In the second adaptation, a similar temperature controller is utilized. The controller, in this instance, is provided with a separate program unit which comprises a slide wire, a cam upon which ride the rollers of a pair of levers, a slide wire contact carried by these levers, and a synchronous motor for driving the cam. The lever mounted contact, operated by the motor, may be moved over the stationary slide wire according to any desired rate of change program, as determined by the contour of the cam. In order to apply this controller to different programs, it is necessary to change the cam for each specific program. Moreover, a separate program unit is required for use with thermocouples having different thermoelectric characteristics for different ranges of furnace operating temperatures.

With the apparatus of the present invention, I overcome the limitations present in the above described representative types of program controllers, and as an object of this invention provide an improved program controller by means of which a rate of change in the application of energy may be quickly and conveniently regulated at any value from zero to a maximum rate of change.

Another object of this invention is to provide means by use of which, for instance, the temperature in a metallurgical furnace may be raised to any desired maximum temperature at any predetermined rate of heating, and gradually lowered at any desired rate which is less than the maximum cooling rate inherent in the particular furnace and in the material under treatment.

A further object of this invention is the provision of means by use of which, for example, the temperature in a metallurgical furnace may be raised to any desired maximum temperature at any predetermined rate of heating, held at this maximum value for any desired length of time and gradually lowered at a rate limited only by the inherent factors mentioned immediately above.

Other objects and advantages will become apparent as the description proceeds, in which:

Figure 1 is a schematic diagram of my program controller in circuit with a potentiometer type temperature controller, a thermocouple and a furnace;

Figure 2 is a view similar to Figure 1 illustrating the use of my program controller with a millivoltmeter type of temperature controller; and, Figures 3 and 4 are schematic views showing modifications of the program controller device.

In the drawings, A designates a furnace adapted to be heated by suitable means, as for example, the heating element $a$ in circuit with a source of electric power E. Associated with said heating means are a temperature control device, generally designated B, and a thermocouple T, both of which are standard devices and well known in the art.

In the form of Figure 1, the control device B is of the potentiometer type, including a calibrated slide wire 33 having an adjustable contact 34. The slide wire is connected across a source of potential schematically indicated at 35, it being understood that such source is adapted to supply a constant E. M. F. for the control device.

36 designates a galvanometer connected to the adjustable contact 34 and to one side of the thermocouple T, the deflection element 38 of said galvanometer being connected in circuit with the heating element $a$ through a suitable contact means 39 and the source of current E. One terminal of the slide wire 33 is connected in the thermocouple circuit as hereinafter described.

Under former practice, the controller B is connected in circuit with the thermocouple T, whereby their E. M. F.'s are opposed, and any unbalance therebetween is detected by the galvanometer 36 controlling the heating circuit to balance said forces through a change in the furnace temperature and the resulting thermocouple E. M. F. The ultimate furnace temperature is obtained by adjusting the contact 34 of the slide wire 33 to an E. M. F. corresponding to the desired temperature, as indicated by its calibrated scale.

My invention provides for selectively determining and maintaining a rate of heating, cooling or the like in such a circuit through controlling the temperature control device, and to this end, I have provided a program controller capable of being readily and simply connected in the control circuit to effect a high degree of selectivity of control therein.

The program control device is generally designated C, and includes a voltage-dividing slide wire 41 connected across a potentiometer including a source of potential 42 and an adjustable resistance 43. One terminal of the slide wire is also connected to one side of the thermocouple T, and an adjustable contact 44 for the slide wire is connected to a terminal of the temperature controller slide wire 33, thereby connecting the program controller and thermocouple in series with said temperature controller circuit.

In the program controller circuit, I also provide a milliammeter 45 actuated by the current flowing in said circuit and calibrated in terms of degrees of temperature per hour. If desired, said instrument may be provided with a plurality of scales 46 calibrated for different types of thermocouples.

The contact 44 of the slide wire 41 is rotatable at constant speed, as by a synchronous reversible motor 47 and reduction gear drive 48, and hence the slide wire may be calibrated in units of time, as for example, in hours. Since the resistance of the slide wire is constant, the adjustment of resistance 43 in regulating the current through the slide wire provides a definite E. M. F. across the latter. Any desired portion of the said E. M. F. can be utilized by positioning the contact 44. Thus, the slide wire, potentiometer and milliammeter of the program controller C may be adjusted to provide a desired rate of change of E. M. F. delivered thereby.

In operation, the temperature controller B is set and remains at the desired limiting temperature by adjustment of its slide wire contact 34 on the temperature scale. The potentiometer 42—43 of the program controller C is adjusted to supply a constant current in accordance with the selected rate of heating per hour.

Having thus selected the ultimate temperature desired for the furnace and the rate of heat increase to attain that temperature, the operator may determine the number of hours necessary to complete said selected heating cycle, and set the slide wire contact 44 accordingly. It is to be noted that these adjustments will supply an initial E. M. F. by the program controller equal to the E. M. F. corresponding to the selected temperature limit for the furnace, as indicated by the temperature controller.

Thus, at the instant of starting the heating cycle, there is no flow of current in the thermocouple circuit due to the fact that the E. M. F. of the program controller balances that of the temperature controller B at its selected limit, whereby the controller B is inoperative to actuate the furnace heating element $a$.

Upon starting the motor 47, the contact arm 44 is driven toward the 0 end of the slide wire, thereby constantly decreasing the program controller E. M. F., whereupon the temperature controller becomes operative to energize the heating element of the furnace through the deflection of galvanometer 36, engaging element 38 and contact 39 in the power circuit E. The resulting temperature rise in the furnace A increases the thermocouple E. M. F. to maintain the sum of the program controller E. M. F. and thermocouple E. M. F. constant at the amount corresponding to the selected temperature limit, thereby maintaining a balanced circuit.

The cycle continues through the time allotted thereto until the program controller E. M. F. is zero and the entire balancing E. M. F. is supplied by the thermocouple T, the furnace having attained the selected temperature.

The furnace may be cooled at a selected rate in the same manner, the slide wire contact 44 of the program controller C being driven in a reverse direction to increase the program controller E. M. F. and thereby define the decrease in the furnace heat and the thermocouple E. M. F. while maintaining balance as before.

Figure 2 illustrates the use of my program controller C in connection with a thermocouple T and a temperature controller B' of the millivoltmeter type. In this type of temperature controller, a coil 49 actuates a rotatable contactor 50 in accordance with the current flowing through the coil, said coil being connected in series with the thermocouple and program controller as shown. The scale 51 for the arcuate travel of the contactor is calibrated in degrees of temperature, said scale representing E. M. F. corresponding to said temperatures.

The contactor 50 and an arcuate conductor 53 are connected in the heating circuit with the furnace element a and the source of power E, said conductor 53 being rotatably adjustable concentric with the scale 51. Said contactor 50 is adapted to have sliding contact with the conductor 53 as indicated at 52. By positioning the terminal 54 of said conductor 53 in radial alignment with the desired temperature selected upon the scale 51, the heating circuit will be interrupted as the contactor 50 passes beyond said terminal, as for example, when the furnace has reached its selected temperature.

By the employment of my improved program controller C with such a temperature controller and a thermocouple T, I am enabled to provide for linear rates of heating or cooling as before, the E. M. F. of the controller C being initially equal to that required to advance the contactor 50 to the pre-located terminal 54 of the conductor 53 to balance the circuit. As the program controller E. M. F. decreases, the temperature controller effects an energization of the heating element a, and the resulting temperature rise of the furnace correspondingly increases the E. M. F. of the thermocouple T to balance the circuit. Thus, the total E. M. F. supplied to the temperature controller B' is maintained constant at the selected limiting value throughout the heating or cooling cycle as before.

Figure 3 shows a modified circuit for the slide wire 41 by which the furnace may be raised at a desired rate to a maximum temperature, in a time indicated by the travel of contact 44 to an intermediate position X with respect to the slide wire terminals followed by cooling of the furnace at the same rate, by continued travel of the contact 44 beyond the point X.

Figure 4 shows a further modification for said slide wire by which the furnace, after being raised to a temperature as described above, may be held at such temperature for a period of time in accordance with the length of a shorting segment 55 applied to the slide wire, after which the furnace is cooled at the original rate as in Figure 3.

From the foregoing it will be apparent that I have provided a controlling potential which is differentially or cumulatively combined with the E. M. F. of the thermocouple, whereby the total potential applied to the temperature control device is the algebraic sum of the E. M. F.'s of the program controller and thermocouple. Hence, by the variation of one of said E. M. F.'s in relation to a selected constant E. M. F. for the temperature controller, I am enabled to define the rate of change of the other E. M. F. for the purpose of controlling the latter.

It will readily be seen that by means of my invention, a high degree of selectivity is provided and enables the operator to establish a desired program control by simple adjustment of the program and temperature controllers and without the use of additional equipment. Further, the program controller of my invention constitutes a self-contained complete instrument which may be readily inserted in any standard temperature controller and thermocouple circuit.

While I have shown and described the apparatus of my invention as applied to a heating program control as one application thereof, it will be understood that I am not to be limited thereto, as other applications and uses thereof may be employed without departing from the spirit and scope of the invention. The invention readily lends itself to the regulation of rates of change of electric current, rates of change of speed or rates of change of energy in any form which can be measured and controlled by its proportionality to an electromotive force.

I claim:

1. In a control system of the character stated, a control device responsive to an E. M. F. to limit the operation of the system, means for generating an E. M. F. in response to the operation of the system, a potentiometric source of E. M. F. external to the control device, said generating means and external source being connected in series and in continuous circuit with the control device to subject the latter to the algebraic sum of their E. M. F.'s, and means for varying the external source of E. M. F. by increasing or decreasing said E. M. F. to or from an amount equal to the limiting E. M. F. of the control device to define a rate of change of E. M. F. of the system by said control device.

2. In a control system of the character described, a control device responsive to an E. M. F. to limit the operation of the system, means for generating an E. M. F. responsive to the means to be controlled by said controller, a potentiometric source of E. M. F. external to the control device, the E. M. F. of said generating means and the external E. M. F. being in opposition to the said controller E. M. F. and providing a balanced continuous circuit therewith, and means for varying said external E. M. F., the controller being responsive to the resulting unbalance to effect a change in the means controlled with an accompanying change in the E. M. F. of the generating means to maintain the said circuit in balance.

3. In a temperature control system for a furnace or the like having a heating means, a control device for regulating the heating means and operable to limit the temperature of the furnace at a selected amount, a thermocouple responsive to the furnace temperature and a potentiometric source of E. M. F. external to said control device, the external E. M. F. and the thermocouple being in series and in continuous circuit with the control device to subject the latter to the algebraic sum of their E. M. F.'s, and means for varying said external E. M. F. by increasing or decreasing said E. M. F. to or from an amount equal to the E. M. F. corresponding to said temperature limit to define a rate of heat change of the furnace by the control device.

4. In a temperature control system, a temperature controller adapted to regulate the heat supplied to a means to be controlled and responsive to an E. M. F. to limit the temperature of said means, a thermocouple responsive to the temperature of the means to be controlled, a program controller including a pontentiometric source of E. M. F. and a slide wire, the latter being calibrated in units of time, the E. M. F.'s of the thermocouple and program controller being in opposition to the said E. M. F. of the temperature controller and providing a balanced continuous circuit therewith, means for driving the slide wire of the program controller at constant speed to define a rate of heating or cooling for the temperature controller, the thermocouple being responsive to the resulting heating or cooling to maintain the said circuit in balance.

5. In a temperature control system, a temperature controller adapted to regulate the heat supplied to a means to be controlled and responsive to an E. M. F. to limit the temperature of said means, a thermocouple responsive to the temperature of the means to be controlled, a program controller including a potentiometric source of E. M. F. and a slide wire, the latter being calibrated in units of time, indicating means for the program controller for indicating the E. M. F. change of said program controller per unit of time, and being responsive to said potentiometric E. M. F., the E. M. F.'s of the thermocouple and program controller being in opposition to the said E. M. F. of the temperature controller and providing a balanced continuous circuit therewith, means for driving the slide wire of the program controller at constant speed to define a rate of heating or cooling for the temperature controller, the thermocouple being responsive to the resulting heating or cooling to maintain the said circuit in balance.

6. In a temperature control system, a temperature controller adapted to regulate the heat supplied to a means to be controlled and responsive to an E. M. F. to limit the temperature of said means, a thermocouple responsive to the temperature of the means to be controlled, an external potentiometric source of E. M. F., the E. M. F. of the thermocouple and the external E. M. F. being in opposition to the said controller E. M. F. and providing a balanced continuous circuit therewith, and means for decreasing the external E. M. F. from an amount equal to the E. M. F. of the temperature controller at a constant rate of decrease, permitting the temperature controller to cause a corresponding increase of the E. M. F. of the thermocouple to maintain said circuit in balance 7. In a temperature control system for a furnace or the like having a heating means, a control device for regulating the heating means and operable to limit the temperature of the furnace at a selected value, a thermocouple responsive to the furnace temperature and a program controller in series therewith, said program controller including a potentiometric source of E. M. F. and a slide wire, the latter being calibrated in units of time, the thermocouple and program controller being in continuous circuit with the control device to subject the latter to the algebraic sum of their E. M. F.'s and means for driving the slide wire of the program controller at constant speed to increase or decrease the program controller E. M. F. to or from an amount equal to the E. M. F. corresponding to said temperature limit to define a rate of heat change of the furnace by the control device.

8. A program controller adapted to supply a varying E. M. F. to a control circuit, including a potentiometric source of E. M. F. and a voltage-dividing slide wire having a movable contact, said slide wire being calibrated in units of time, means for driving the slide wire contact at constant speed, and indicating means responsive to the potentiometer current indicating the E. M. F. change per unit of time across the contact position and the zero end of the voltage-dividing slide wire.

ANDREW G. YOUNG.